United States Patent [19]

Kelley

[11] Patent Number: 5,537,033
[45] Date of Patent: Jul. 16, 1996

[54] PROTECTIVELY COATED POSITION SENSOR THE COATING AND PROCESS FOR COATING

[75] Inventor: Kurtis C. Kelley, Washington, Ill.

[73] Assignee: Caterpillar Inc., Peoria, Ill.

[21] Appl. No.: 464,537

[22] Filed: Jun. 5, 1995

Related U.S. Application Data

[62] Division of Ser. No. 353,790, Dec. 12, 1994.

[51] Int. Cl.$^6$ ........................................... G01B 7/14
[52] U.S. Cl. .................. 324/207.24; 324/207.16; 73/865.9
[58] Field of Search .................................. 524/112, 114; 73/865.9; 324/207.24, 207.16

[56] References Cited

U.S. PATENT DOCUMENTS

| | | | |
|---|---|---|---|
| 4,385,297 | 5/1983 | Schmitt et al. | 340/870.31 |
| 4,828,474 | 5/1989 | Ballantyne | 425/150 |
| 5,033,298 | 7/1991 | Hoeck | 73/161 |
| 5,385,655 | 1/1995 | Brent et al. | 204/181.1 |
| 5,438,261 | 8/1995 | Codina et al. | 324/207.16 |

Primary Examiner—Peter D. Mulcahy
Attorney, Agent, or Firm—Pankaj M. Khosla

[57] ABSTRACT

A spring of a position sensor is coated with a coating which consists of diglycidyl ether of bisphenol A, polysebacice polyanhydride and polytetrafluoroethylene which is hardened by the process of this invention and forms a hardened protective coating which promotes extended life of the sensor.

4 Claims, No Drawings

PROTECTIVELY COATED POSITION SENSOR THE COATING AND PROCESS FOR COATING

This is a divisional application of application Ser. No. 08/353,790, filed Dec. 12, 1994.

TECHNICAL FIELD

The present invention relates to a protectively coated position sensor, the chemical mixture for coating the sensor and the process for coating the sensor.

BACKGROUND ART

Position sensors of the type a spring is connected to a power source and the electrical resistance changes with the expansion and contraction of the spring, are well known in the art. In this art, the electrical resistance measured is a function of the relative positions of the spring and such sensors are often used in hydraulic cylinders to sense the related position of the end of the cylinder.

The sensors generally are a coil spring that is linearly compressible, but the sensor can be a helical rotatable spring.

In the use of sensors of this type, the spring is generally operated in a harsh environment which causes faulty readings or failure in a time period that is less than desirable.

The present invention is directed to overcome the problems of these heretofore utilized sensors and the sensor of this invention has the advantageous properties of being flexible and able to withstand repeated flexing, the coating has excellent adhesion to the spring, has good dielectric properties, has excellent thermal shock resistance, a low coefficient of friction, excellent solvent resistance, a wide temperature use range, and low temperature application to avoid effecting spring temper.

DISCLOSURE OF THE INVENTION

In one aspect of the invention, a coating composition comprises diglycidyl ether of bisphenol A, polysebacic polyanhydride, polytetrafluoroethylene powder and acetone.

In another aspect of the invention, a position sensor has a spring having coils and the spring coils are moveable one toward the other and the spring is connectable to a power source. A protective coating is on the spring. The coating comprises diglycidyl ether of bisphenol A, polysebacic polyanhydride and polytetrafluoroethylene.

In yet another aspect of the invention, a process is provided for forming a protective coating on a metal position sensor by the following steps: Step A. heating and mixing diglycidyl ether of bisphenol A at 100 parts by weight and polysebacic poly anhydride in the range of about 65 to about 90 parts by weight; Step B heating the mixture of Step A to a temperature and for a time sufficient to generate a reaction and form a gel; Step C cooling the gel of Step B to about ambient temperature; Step D adding the cooled mixture of Step C to acetone in an amount sufficient to saturate, dissolve, and result in a base liquid; Step E adding and mixing polytetrafluoroethylene to the base liquid in an amount in the range of about 5 to about 20 weight percent and forming a resultant coating suspension; Step F applying the resultant coating suspension to a position sensor spring; and Step G heating the coated spring to a temperature and for a time sufficient to harden the coating on the spring.

BEST MODE FOR CARRYING OUT THE INVENTION

Position sensor, as for determining the relative positions of an end of a hydraulic cylinder for example, are well known in the art. These sensors, however, operate in harsh environments and therefore must be carefully protected. The applicants of this invention have discovered a new compound and process for coating the sensors which will significantly extend the operating life of the sensor.

The coating composition is comprised of diglycidyl ether of bisphenol A, polysebacic polyanhydrid, polytetrafluoroethylene, and acetone. The diglycidyl ether of bisphenol A is in the range of about 100 parts by weight. The polysebacic polyanhydride, preferably of the type known as PSPA and sold by Anhydrides and Chemicals, Inc., is in the range of about 65 to about 90 parts by weight, preferably about 70 parts by weight. The polytetrafluoroethylene powder, preferably of the type commonly used in fluidized bed coating, is in the range of about 5 to about 20 parts by weight, preferably about 15 weight percent of the mixture. Sufficient mixture of the ether, anhydride and polytetrafluorethylene is added to a given amount of acetone to saturate the acetone.

Amounts of the anhydride greater than about 90 parts by weight are undesirable because the coating properties may suffer due to the presence of excess unreacted anhydride.

Amounts of the anhydride less than about 65 parts by weight are undesirable because the coating properties may suffer due to the presence of excess unreacted ether.

Amounts of the polytetrafluoroethylene powder less than about 5 weight percent are undesirable because the powder particles are too distantly spaced in the resultant coating to have sufficient effect on the friction coefficient.

Amounts of the polytetrafluoroethylene power greater than about 20 weight percent are undesirable because such resultant coating is difficult to apply in a uniform smooth layer.

The position sensor has a spring having coils and the spring coils are moveable toward one another and are connectable to a power source, as is known in the art. The protective coating of this invention, as set forth above is applied to the spring to protect the spring against detrimental contact. In the preferred embodiment, which is useful in a hydraulic cylinder, is a helical spring encircling the rod end of the cylinder and being linearly compressible thereby.

In the process of this invention, the ether and anhydride are heated to a temperature in the range of about 75 to about 100 degrees C., preferably about 80 degrees C. and mixed one with the other. Heating temperatures less than about 75 degrees C. are undesirable because the anhydride will be insufficiently melted and thorough mixing of the ether will be less than desirable.

Heating temperature greater than about 100 degrees C. are undesirable because curing action may occur resulting in reducing the amount of time available for mixing and handling.

The temperature of the mixture is then increased to a temperature and for a time sufficient to generate a reaction and form a gel. In order to form the gel, the mixture is heated to a temperature in the range of about 110 to about 140 degrees C., preferably about 130 degrees C. This increase in temperature step should not take place at less than about 110 degrees C. because the reaction will take place very slowly and monitoring the reaction will represent a waste of time and labor.

The temperature of this heating step should not be greater than about 140 degrees C. because of the difficulty in halting the reaction in the early gel state which will result in the waste of material and labor.

Cooling of the gel is initiated in response to first observation of gel formation in response to said reaction. The gel is cooled preferably by placing the gel container in a cool water bath and bringing the gel to a temperature of about ambient temperature at which the gel will solidify.

Acetone is then added to the solidified gel in an amount just sufficient dissolve the solidified gel and generate a saturated base liquid. Powdered polytetrafluoroethylene, as set forth above, is then added to the resultant base mixture and agitated during application of the resultant coating to the sensor spring. Application is preferably by spraying although other methods can be used without departing from this invention.

The coated spring is then heated to a temperature and for a time sufficient to harden the coating on the spring. The temperature of the coated spring heating step is in the range of about 150 to about 180 degrees C., preferably about 150 degrees C. The heating time varies depending upon the mixture and temperature, but is preferably is continued until the coating loses all signs of tackiness at the cure temperature and rebounds when depressed with the pint of a pin. Additional time at the cure temperature will not damage the coating.

The heating temperature of the coated spring should not be less than about 150 degrees C. because the curing time may be excessively long which will undesirably allow the teflon to settle or clump. The heating temperature of the coated spring should not be more than about 180 degrees C. because the coating may be undesirably damaged prior to complete cure.

INDUSTRIAL APPLICABILITY

By providing the process and coating composition of this invention, the position sensor can withstand a most harsh environment and contains beneficial physical properties as set forth above.

Other aspects, objects and advantages of this invention can be obtained from a study of the disclosure and the appended claims.

I claim:

1. In a position sensor used for determining the position of a hydraulic cylinder, said sensor having a spring, said spring having coils and said spring coils being moveable one toward the other and being connectable to a power source, the improvement comprising:

said spring having a protective coating, said coating being a hardenable gel having a composition, comprising:
   (A) a reacted resin mixture, said resin mixture consisting of:
      (a) a reacted and solidified gel of diglycidyl ether of bisphenO1 A; and
      (b) a reacted and solidified gel of polysebacic polyanhydride; said diglycidyl ether and said polyanhydride being present in a weight ratio in the range Of about 100:65 to about 100:90, diglycidyl ether-:polyanhydride;
   (B) polytetrafluoroethylene powder; said powder and said reacted resin mixture being present in a weight ratio in the range of about 5:95 to about 20:80, powder:resin mixture respectively; and
   (C) acetone in an amount sufficient to dissolve said resin mixture.

2. A sensor, as set forth in claim 1, wherein said diglycidyl ether and said polyanhydride are present in a weight ratio of about 100:70, diglycidyl ether:polyanhydride; and said polytetrafluoroethylene powder and said reacted resin mixture are present in a weight ratio of about 15:85, powder:resin mixture respectively.

3. A sensor as set forth in claim 1, wherein said hardenable gel is hardened to a hardness greater than about Shore D 50.

4. A sensor, as set forth in claim 1, wherein said spring of said sensor is a helical spring.

\* \* \* \* \*

UNITED STATES PATENT AND TRADEMARK OFFICE
CERTIFICATE OF CORRECTION

PATENT NO. : 5,537,033
DATED : July 16, 1996
INVENTOR(S) : Kurtis C. Kelley It is certified that error appears in the above-identified patent and that said Letters Patent is hereby corrected as shown below:

Column 4, claim 1, line 16, delete "bisphenOl" and insert --bisphenol--

Signed and Sealed this

Fifteenth Day of October, 1996

*Attest:*

BRUCE LEHMAN

*Attesting Officer*     Commissioner of Patents and Trademarks